United States Patent [19]

Engeler et al.

[11] Patent Number: 4,735,091

[45] Date of Patent: Apr. 5, 1988

[54] HIGH PRESSURE TRANSDUCER

[75] Inventors: Paul Engeler, Frauenfeld; Hans-Conrad Sonderegger, Neftenbach; Peter Wolfer, Kleinandelfinge; Reto Calderra, Neftenbach, all of Switzerland

[73] Assignee: Kristal Instrumente AG, Winterthur, Switzerland

[21] Appl. No.: 933,938

[22] Filed: Nov. 24, 1986

[51] Int. Cl.⁴ ............................. G01L 7/08; G01L 9/08
[52] U.S. Cl. ......................................... 73/756; 73/706; 73/723; 73/754
[58] Field of Search .................. 73/756, 754, 706, 715, 73/723, 724, 725, 726, 727, 728, 167, 35

[56] References Cited

U.S. PATENT DOCUMENTS

| | | | |
|---|---|---|---|
| 3,857,287 | 12/1974 | Sonderegger | 73/706 |
| 4,399,706 | 8/1983 | List et al. | 73/706 |
| 4,519,254 | 5/1985 | Sonderegger et al. | 73/167 |
| 4,559,821 | 12/1985 | Engeler et al. | 73/167 |

Primary Examiner—Donald O. Woodiel
Attorney, Agent, or Firm—Barnes & Thornburg

[57] ABSTRACT

A transducer, particularly for ballistic high pressure measurements, comprises an assembly body, with a shoulder sealing section and a sensor member, which can be received in a recess in the assembly body. The assembly body can be screwed into a component, e.g. a gun barrel, the measurement area on the sealing section being sealed. The assembly body has a tubular extension extending beyond the sealing section, which extension encompasses the sensor member on a cylindrical fitting face. The high sealing forces required for sealing the measurement area are kept remote from the sensor member. The measuring sensitivity of the transducer is therefore independent of the prevailing tightening torques. A cylindrical gap between the sensor member and assembly body provides additional insulation between the sealing forces and the prestress forces prevailing in the sensor member. The cylindrical gap is sealed against the pressure medium by a force fit or weld between the assembly body and the sensor member. A reception space can be provided ahead of the diaphragm section of the sensor member, which reception space can be formed by an annular section projecting from the diaphragm section, and can be provided with replaceable thermal and erosion protection devices.

27 Claims, 2 Drawing Sheets

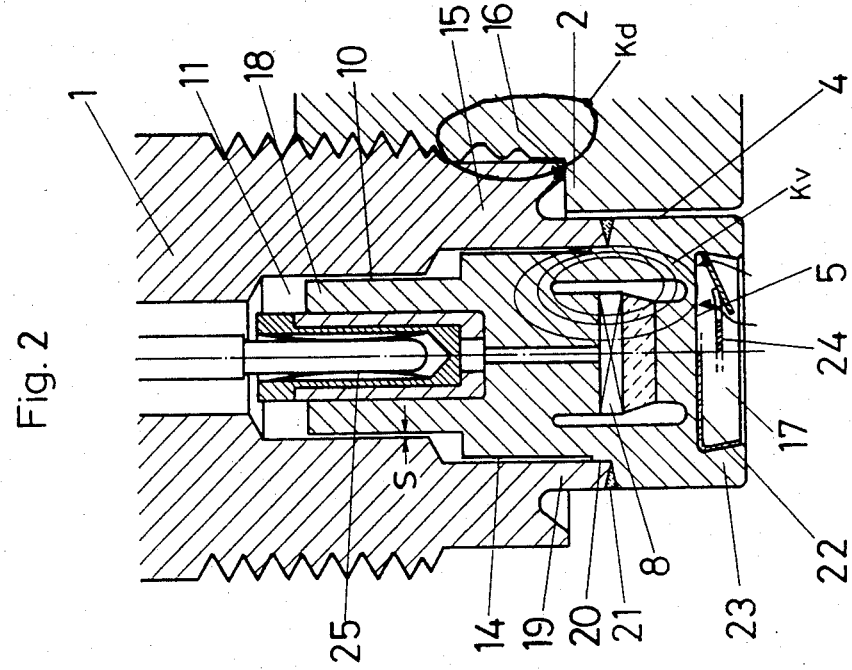
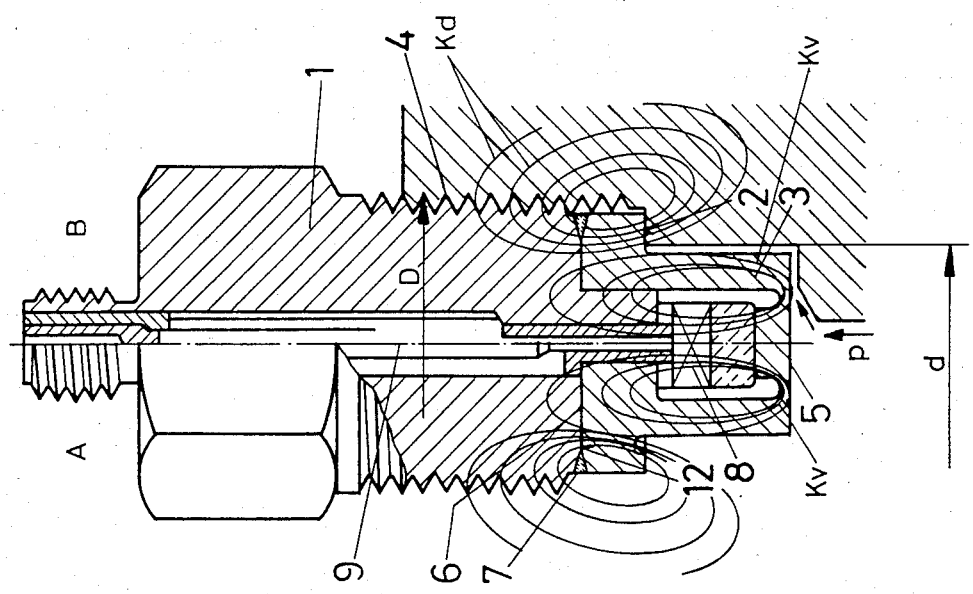

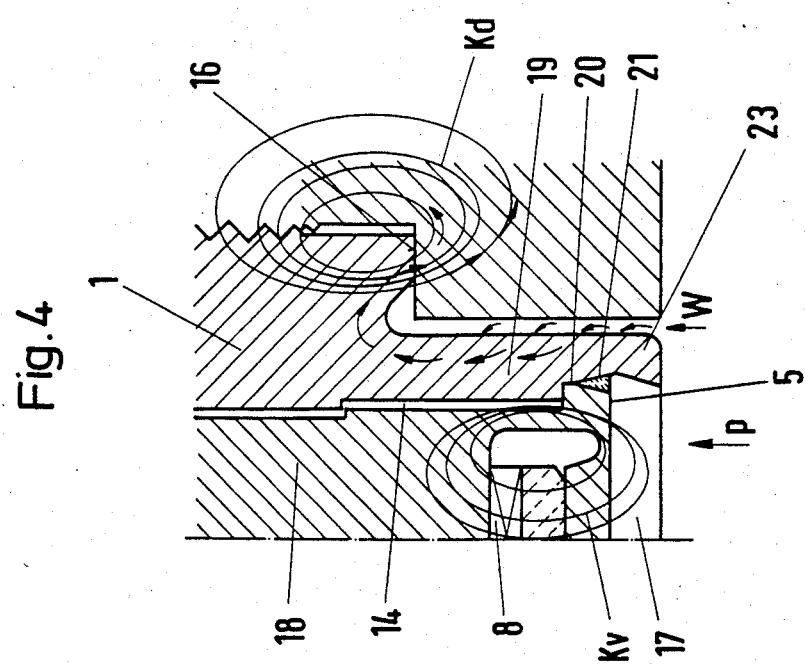
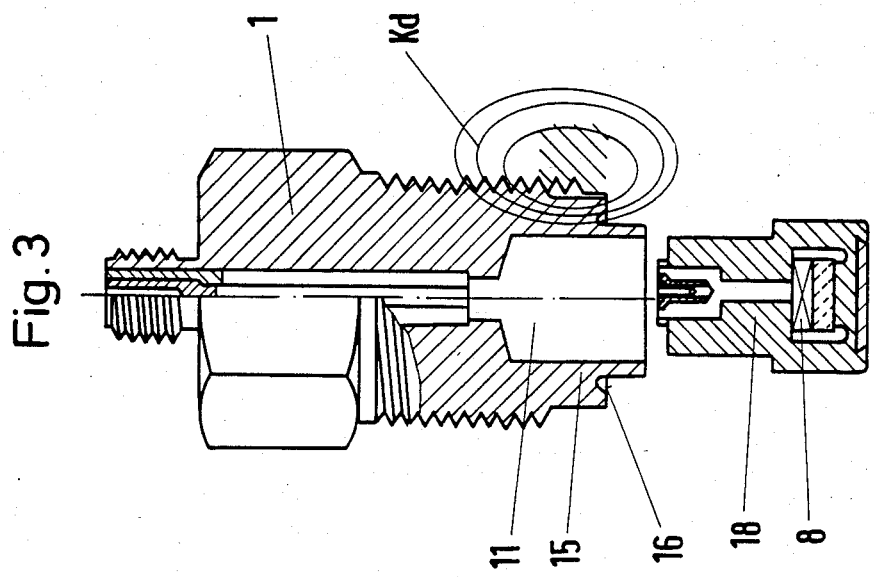

HIGH PRESSURE TRANSDUCER

BACKGROUND OF THE INVENTION

The present invention relates to a transducer, particularly for high pressure measurements.

The measurement of pressures up to $10^9$ Pa is a specialist field which is of particular importance in ballistics. Pressures of up to $2\times10^8$ Pa also occur during injection processes in diesel engines. In more recently developed pulse . cutting processes, hydraulic pressure peaks of up to $4\times10^8$ Pa are employed. In practice, however, pressures higher than this will be found only in the development of gun powder and ballistics.

The invention relates in particular, but not exclusively, to transducers for determining such high pressures. A preferred area of application is therefore ballistic pressure measurement in the development of guns and munitions, in order to determine the course of the pressure while a shot is being fired. In powder development, corresponding measurements are carried out in so-called pressure bombs. Another area of application is high pressure measurement in liquid media. In all cases these are processes which last just a few milliseconds and can lead to pressure amplitudes of up to $10^9$ Pa.

Copper crusher elements which are still used, particularly in the inspection of munitions, are well known for such measurements. Today, however, electronic measurements by means of piezoelectric transducers in particular are preferred. For dynamic high pressure measurements, piezo-measuring techniques are extremely advantageous because the extraordinarily high resolution enables the course of the pressure to be monitored very accurately from ignition, at pressures of a few Pascals, to combustion at pressure of up to $10^9$ Pa. In addition, the piezo-effect as a volume effect in piezocrystals allows a measurement which takes place practically without deformation. The diaphragm sections of such piezotransducers are therefore in principle only subjected to minimum deformations, which essentially assures a long service life.

For the pressure-tight securing of such transducers in a component, e.g. in a pressure vessel, the dimensions of the assembly holes to be made therein, as well as the transducer dimensions, have been largely standardized; NATO in particular has issued standards and regulations to cover this. Two types of sealing devices are used, namely the shoulder seal and the pocket- or blind-hole seal. In Europe transducers with shoulder seal are mainly used, on the basis of relevant NATO regulations, while in the USA the pocket- or blind-hole seal is preferred.

Because of the short-lived pressure thrusts, with unusually high amplitudes, the sealing of the transducer in the assembly hole is extremely important, since the slightest leak can lead to flashovers, as a result of which the transducers may be burnt out and rendered unusable after a few applications. Lapped surfaces are frequently provided as sealing surfaces which, although they do not require additional sealants in the form of sealing rings or the like, suffer from the disadvantage that relapping is required whenever the transducer is removed.

Moreover, thin copper rings have already been used, but again these are difficult to remove from the contact surfaces. Self-adapting steel sealing rings, according to DE-C-17 75 646, have proved particularly advantageous in providing a perfect seal and ensuring a reduction in the torques to be applied for a secure, tight fit of the transducers. However, the tightening torques are comparatively high, and may attain values as high as 60 Nm, which may result in corresponding deformations of the sealing surfaces and other sensitive transducer components, which in turn will affect the measuring sensitivity. Because of the high tightening torques required, no transducers have so far become available whose sensitivity is not influenced in practice by the assembly process.

FIG. 1, which will be discussed in greater detail hereinafter, shows a typical known piezoelectric high pressure transducer with a shoulder seal. The effect of the assembly process on the sensitivity of the transducer stems from the fact that the sealing forces penetrate the sensor section by way of the sealing flange. This gives rise to split spring effects in the area of the plane of separation and deformations of the sensor section, which in turn influence the diaphragm section of the transducer acting on the sensor elements. This leads in particular to a situation where a differnt measuring sensitivity is obtained whenever the transducer is inserted into the assembly hole, rendering it practically impossible to obtain accurate, reproducible measurements. Furthermore, a transducer is known from EU-A-0 090 872 with a shoulder seal, where the sensor member rests, with one of its flat end faces, on an adjacent flat surface of an assembly body recess partially receiving the sensor member, and is welded thereat. An annular gap which is open to the pressure medium to be studied is provided between the recess of the assembly body and the sensor member. Although the annular gap prevents the transfer of the force lines emanating from the shoulder sealing faces to the sensor member, the pressure medium to be examined may reach the inside of the transducer through the annular gap, causing damage.

SUMMARY OF THE INVENTION

One object of the invention is to provide a transducer in which the difficulties associated with known transducers are eliminated. A particular object of the invention is to provide a transducer which can be used in many different applications, particularly for measuring the pressures of hot, gaseous pressure media, and whose sensitivity is substantially not influenced by the prevailing installation conditions.

According to the present invention, there is provided a transducer, particularly for high pressure measurements, comprising an assembly body adapted to be secured in a hole of a component, with a shoulder sealing section for sealing the transducer with respect to the hole, and a sensor member connected with the assembly body, having a diaphragm section acting on a sensor element, wherein the assembly body has a tubular extension projecting axially from the shoulder sealing section, along which extension the connection between the sensor member and the assembly body is essentially provided, in order substantially to prevent the transmission of the assembly and sealing forces which occur in the area of the shoulder sealing section, to the sensor member.

By providing the tubular extension on the assembly body of the transducer, the place where the sensor member is connected to the assembly body can be arranged so that the area of action of the sealing forces acting on the shoulder sealing section, and the area of action of the initial tensile (clamping) forces prevailing in the sensor member, can be substantially separated from each other, advantageously in different parts of the transducer. This means that the area of influence of the sealing forces does not substantially reach the area of contact and connection between the sensor member and the assembly body.

According to a further embodiment of the invention, the sensor member may comprises a concentric centering section, which is sealed by the tubular extension. The surface or plane of separation on or in which the sensor member and assembly body come into contact, therefore has an essentially axial orientation, which largely coincides with the main direction of extension of the sensor prestress and the sealing forces. By contrast, the flat separating or contact surfaces provided in the known transducers lie transversely to the direction of the sealing forces, which gives rise to undesirable split spring effects in the plane of separation.

The method of engagement between the sensor member and the assembly body, provided by the present invention, therefore inherently and far-reachingly avoids such split spring effects and can in addition be arranged at a location along the length of the sensor section without any problem, which lies outside the area of action of the sealing and prestress forces, i.e. along that section of the sensor member which is arranged substantially freely in the assembly hole of the component.

According to a further embodiment of the invention, the tubular extension can be extended up to the diaphragm section, so that the diaphragm section is surrounded by the tubular extension, in the fashion of a protective ring, and so that the sensor member in the region of the diaphragm section can be connected to the tubular extension. The sensor member should preferably lie outside the point of connection, separated from the tubular extension by an annular gap. This not only provides mechanical stabilization of the diaphragm section but also minimizes the area of the end face of the sensor member exposed to the pressure medium. The sensor member may form a unit which can be mass-produced and can be tested separately from the transducer, whereupon the unit is inserted in the tubular shoulder and connected to it. The annular gap between the tubular extension and sensor member provides an effective separation of the prestress forces prevailing in the sensor member from the sealing forces in the area of the shoulder sealing section, as well as a thermal insulation.

A preferred further embodiment of the invention additionally provides that a portion of the sensor member be received in the assembly body with spacing (on all sides). The clearance formed between the sensor member and the assembly body is sealed against the pressure medium, thereby effectively preventing, on the one hand, the pressure medium to be examined from penetrating into the inside of the transducer through the cylindrical gap between the sensor member and the assembly body, and on the other hand, the deformations of the assembly body caused by the sealing forces from being transmitted to the sensor member. The connection according to the invention between the assembly body and the sensor member, which may include a weld, advantageously seals the cylindrical gap.

The transducer according to the invention, with a shoulder seal, is characterized both by a high degree of constancy of the measuring sensitivity, and by a long service life, since the sensitive diaphragm section is in practice not loaded by the sealing forces. The sensitivity of the transducer is influenced neither by the level of the tightening torque in the pressure-tight securing of the transducer within the assembly bore, nor by elastic marginal conditions in the sealing area, such as gap elasticities, etc., nor by media with an aggressive action penetrating into the inside of the transducer, such as hot combustion gases. This ensures that, regardless of the prevailing individual installation and operating conditions, both the measuring accuracy itself and the reproducibility of the measurement remain unchanged for a long period of time.

BRIEF DESCRIPTION OF THE DRAWING

The invention will be explained in greater detail in the following with reference to the preferred embodiments and the drawing, with prior reference to the state of the art.

FIG. 1 is a cross-sectional view of a prior art high pressure transducer with a shoulder seal;

FIG. 2 is a cross-sectional view of a high pressure transducer with a shoulder seal, according to the invention;

FIG. 3 illustrates the transducer shown in FIG. 2, with separate assembly body and sensor member; and FIG. 4 shows in a fragmentary sectional view, a modified embodiment of a high pressure transducer according to the invention.

DETAILED DESCRIPTION OF THE DRAWINGS

FIG. 1 shows a known high pressure transducer with a shoulder seal. The left half of this figure, denoted by A, shows a transducer in which the sensor member 3 extends into the vicinity of the median axis, while in the design B, shown in the right half of this figure, the sensor section is further away from the median axis. However both designs A and B suffer from the aforementioned disadvantages though the effect of the sealing forces Kd on the internal prestress forces Kv is rather smaller in the design B.

The shoulder seal has the advantage that the diaphragm section 5 of the transducer can be arranged flush with the surface of the measuring space or of a feed hole intended to transmit pressure. As shown, the transducer comprises essentially two main components, namely the sensor member 3 and an assembly body 1. A sealing flange 12 is formed on the top of the sensor member 3.

The known transducer can be secured in an assembly hole 4 in the component surrounding the measuring space. The bore or hole 4 has a lower hole section of small diameter d, and an upper hole section of large diameter D. The two hole sections d and D are concentric to each other. A shoulder surface 2 is formed by the transition of the hole section of large diameter to the hole section of small diameter, to which the sealing flange 12 on the sensor member 3 can be sealed in order to seal the measuring area. The shoulder surface 2 should be exactly perpendicular to the median longitudinal axis of the assembly hole 4.

As shown the hole section of large diameter exhibits an inner thread corresponding to an outer thread on the assembly body 1, thereby enabling the transducer to be screwed tight in the assembly hole 4.

As shown, a sensor element 8 is received in the sensor member 3, the sensor element 8 consisting preferably of one or more suitable piezocrystals whose electrical charges are led outwards through a signal cable 9 extending through the assembly body 1. The lower end face of the transducer exposed to the pressure p of the medium to be examined comprises an internally thickened diaphragm section 5, which transmits the pressure signal generated by the medium pressure p, as a force, to the sensor element 8 and which should preferably be connected integrally to the sensor member 3. The medium pressure p acts both on the diaphragm section 5 and on the free peripheral surface of the area of the sensor member 3 which is received in the hole section of the assembly hole 4 of small diameter d.

The sensor member 3 is in contact, on its upper flat end face 6, facing the assembly body 1, with a contact surface, just as flat, of the assembly body 1, and is welded to it, as indicated at 7. The plane of separation defined by the flat end face 6 of the sensor section 3 extends perpendicularly in relation to the median axis of the transducer.

In order to achieve an adequate sealing effect, the sealing flange 12 must be pressed with considerable force against the shoulder face 2 of the assembly hole 4. For this purpose, suitably high tightening torques must be applied when the assembly body 1 is screwed into the assembly hole 4, which torques may generally be between 20 and 60 Nm. The very high sealing forces Kd resulting therefrom act on the sensor member 3 and its connecting plane 6 with the assembly body 1. The sealing flange 12 of the sensor member 3 is also crushed to a certain degree by the high sealing forces, giving rise to a force which is annularly distributed in the sensor member 3. This in turn causes the diaphragm section 5 to be raised, which expresses itself in a variation in the internal prestress Kv of the sensor member 3 and hence in the sensitivity of the transducer.

The high pressure transducer according to the present invention, with a shoulder seal, in which the aforementioned installation influences essentially do not play any role, is shown in FIG. 2. In the drawing, the same or similar parts as those in the embodiment shown in FIG. 1 are given the same reference numerals, thus these parts need not be described again in the following.

The transducer according to the invention comprises a sensor member 18, which may, at its bottom arranged in the section of the assembly hole 4 of small diameter, correspond essentially to the sensor member 3 of the known transducer in FIG. 1, while an upper section of the sensor member 18 is received in a recess 10 in the assembly body 1. An annular gap 14 of suitable width S is provided between the outer peripheral surface of the upper section of the sensor member 18 and the inner peripheral surface of the recess 10 in the assembly body 1.

The annular gap 14, as shown, is open at its inner end facing the bottom surface of the recess 10 and therefore communicates with a clearance 11 between the bottom surface of the recess 10 and the end face of the sensor member 18 facing it.

An essentially radial shoulder sealing surface 16 is provided at the bottom of a tubular wall portion 15 of the assembly body 1 defining the recess 10, where the sealing surface 16 may engage with the shoulder surface 2 of the assembly hole 4 to form a seal. The sealing surface 16 may have a conical recess or a cavity which can receive a sealing ring, according to the aforementioned DE-C-17 75 646, to which reference may be had for that purpose.

According to the invention, a connecting section or a tubular extension 19 is formed on the assembly body 1, or its tubular wall portion 15, extending axially downwards beyond the sealing surface 16, which tubular extension 19 has a smaller outside diameter than the wall portion 15. The extension 19 defines an inner cylindrical peripheral surface, which embraces a cylindrical peripheral surface on a centering section 20 of the sensor member 18 formed between the upper and lower section. These peripheral surfaces define a cylindrical plane of separation 21 lying essentially coaxially to the center axis of the transducer, along which plane the assembly body 1 and the sensor member 18 are in engagement or in contact with each other. The rigid connection between the two parts should preferably be made by a weld 21 in the area of the free end edge of the extension 19, which at the same time seals the cylindrical gap 14 at the bottom, i.e. against the pressure medium to be examined, so that no gases or combustion residues can penetrate into the gap 14, thereby also avoiding dead spaces undesirable for pressure measurements.

The connecting zone 20, 21 between the tubular extension 19 of the assembly body 1 and the sensor member 18 is located, according to FIG. 2, so that it is not or only slightly affected by the inner prestress forces Kv and the sealing forces Kd. This connecting zone should preferably lie in a section of the sensor member 18 between the shoulder sealing section 16 and the diaphragm section 5, which is received in the section of the assembly hole 4 of the small diameter. It must be pointed out that the upper or inner end face of the sensor member 18 facing the assembly body 1 is not connected to the assembly body.

The measures described ensure that the sealing forces Kd are directed around the sensor member 18. The gap 14 prevents the deformations caused by the sealing forces Kd in the tubular wall section 15 of the assembly body from being transmitted to the sensor member 18.

As shown in FIG. 3, the sensor member 18 and the assembly body 1 may represent units which can be manufactured and tested independently of each other (e.g. in mass production).

As protection against hot aggressive gases, a replaceable thermal protection insert 17 (FIG. 2) may be provided on the outside of the diaphragm section 5, which insert is described in greater detail in CH-C-446 761, so that reference can be made thereto. By suitably designing the diaphragm section 5, pressure elastic, yet highly stable diaphragm structures can be obtained, as explained in further detail in CH-C 578 478.

A modified embodiment of the invention is shown in FIG. 4. This embodiment is characterized in that the tubular extension 19 of the assembly body 1 is extended beyond the diaphragm section 5 in order to form a protective ring 23 which surrounds the diaphragm section 5 on the outside so as to protect the same. The extended extension 19 may also form a diaphragm antechamber 17, as shown in FIG. 4, for receiving the thermal protection insert 22 and/or a replaceable protective cap 24, as shown in FIG. 2. The area of the sensor section 18 exposed to the pressure medium is minimized as a result thereof.

In this embodiment, the connection between the sensor member 18 and the assembly body 1, which can in turn preferably include a weld 21, is located in the area of the diaphragm section 5, thus ensuring that the connection zone is even further away from the area influenced by the sealing forces Kd. A cylindrical gap 14 is provided between the extended tubular extension 19 and the peripheral wall of the sensor member 18 surrounding it, which gap is sealed by the weld 20 against the ingress of the pressure medium to be examined. These measures ensure that the heat flow caused by the hot gases does not in essence take place in the sensor member 18. The heat flow W should instead preferably be directed through tubular shoulder 19 and into the assembly body 1, as indicated by the arrows in FIG. 4. This considerably reduces thermal influences on the prestressed condition of the sensor member 18. For further details of the embodiment shown in FIG. 4, reference can be had to FIG. 2 and its associated description.

According to the invention, the sensor member 18 may also represent a closed transducer element or a unit which can be prefabricated in mass production and pretested separately, whereupon it can be installed or welded in any assembly bodies 1. The unit should preferably include a plug connection 25, indicated in FIG. 2, for signal discharge.

It is understood that the invention can be altered and modified on the basis of the theory presented herein, without departing from its scope. Thus, the rigid connection between the sensor member and the assembly body can, if so desired, be made, instead of by a weld, by e.g. force-fitting the appropriate cylindrical faces, or by a snap connection.

The axial position of the engaging zone between the assembly body and the sensor member is not limited to the conditions described and shown, but can be changed as long as the desired effect is achieved, namely that the prevailing sealing and prestress forces Kd and Kv do not, or only slightly influence each other. Instead of the preferred piezocrystals as sensor element, resistance measuring elements, piezoresistive sensors and the like may also be provided.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A transducer, particularly for high pressure measurements, comprising an assembly body adapted to be secured in a hole of a component by a securing portion, said assembly body having a shoulder sealing section for sealing the transducer with respect to the hole, and a sensor member connected to the assembly body, said sensor member having a diaphragm section acting on a sensor element, the assembly body including a tubular extension projecting axially from and ahead of the securing portion and the shoulder sealing section, the sensor member being connected to a lower end of said extension substantially ahead of said securing portion and said shoulder sealing section, to substantially prevent the transmission of the assembly and sealing forces which occur in the area of the shoulder sealing section to the sensor member.

2. A transducer according to claim 1, wherein the sensor member includes a concentric centering section which is sealingly surrounded by the tubular extension.

3. A transducer according to claim 2, wherein the tubular extension is extended at least up to the diaphragm section so as to surround the diaphragm section in the manner of a protective ring.

4. A transducer according to claim 3, wherein the sensor member is connected with the tubular extension within the area of the diaphragm section.

5. A transducer according to claim 4, wherein the sensor member is spaced from the tubular extension outside the connection place.

6. A transducer according to claim 1, wherein the tubular extension is extended at least up to the diaphragm section so as to surround the diaphragm section in the manner of a protective ring.

7. A transducer according to claim 6, wherein the sensor member is connected with the tubular extension within the area of the diaphragm section.

8. A transducer according to claim 7, wherein the sensor member is spaced from the tubular extension outside the connection place.

9. A transducer according to claim 1, with a portion of the sensor member received in and spaced from the assembly body, wherein the clearance between the sensor member and the assembly body is sealed against the pressure medium.

10. A transducer according to claim 1, wherein the sensor member is welded to the tubular extension.

11. A transducer according to claim 1, wherein the sensor member is a transducer element closed in itself and adapted to be prefabricated in mass production and separately pretested before installation in an assembly body.

12. A transducer according to claim 1, wherein the diaphragm section is formed flat and is protected from attacks by gas jets by means of an elastic protective diaphragm.

13. A transducer according to claim 1, wherein an elastic replaceable flame protection cap, with gas through-flow openings is arranged in a diaphragm antechamber, and said cap being operable to direct bundled gas jets diffusely onto the diaphragm section.

14. A transducer according to claim 1, wherein the sealing forces are separated from the prestress forces prevailing in the sensor member by a cylindrical gap between the sensor member and the assembly body.

15. A transducer, particularly for high pressure measurements, comprising an assembly body adapted to be secured in a hole of a component by a securing portion, said assembly body having a shoulder sealing section for sealing the transducer with respect to the hole, and a sensor member having a diaphragm section acting on a sensor element, said assembly body including a tubular extension projecting axially from and ahead of the securing portion and the shoulder sealing section, the sensor member being connected to a lower end of said extension substantially ahead of said shoulder sealing section and said securing portion, said tubular extension extending at least up to and surrounding circumferentially the diaphragm section, and a portion of the sensor member being received in the assembly body in spaced relationship thereto, the clearance between said portion of the sensor member and the assembly body being sealed against the pressure medium, whereby the assembly and sealing forces occurring in the area of the shoulder sealing section are substantially prevented from being transmitted to the sensor member.

16. A transducer according to claim 15, wherein the sensor member includes a concentric centering section which is sealingly surrounded by the tubular extension.

17. A transducer according to claim 15, wherein the sensor member is welded to the tubular extension.

18. A transducer according to claim 15, wherein the sensor member is a closed transducer element adapted to be prefabricated in mass production and separately pretested before installation in the assembly body.

19. A transducer according to claim 15, wherein the diaphragm section is formed flat and is protected from attacks by gas jets by means of an elastic protective diaphragm.

20. A transducer according to claim 15, wherein an elastic replaceable flame protection cap having gas through-flow openings is arranged in a diaphragm antechamber, said cap being operable to direct bundled gas jets diffusely onto the diaphragm section.

21. A transducer, particularly for high pressure measurements, comprising an assembly body adapted to be secured in a hole of a component by a securing portion, said assembly body having a shoulder sealing section for sealing the transducer with respect to the hole, and a sensor member having a diaphragm section acting on a sensor element, said assembly body including a tubular extension projecting axially from and ahead of the securing portion and the shoulder sealing section, the sensor member being connected with an end of the tubular extension within the area of the diaphragm section substantially ahead of said securing portion and said shoulder sealing section, and the sensor member, with the exception at the place of connection, being spaced from the tubular extension, whereby the assembly and sealing forces occurring in the area of the shoulder sealing section are substantially prevented from being transmitted to the sensor member.

22. A transducer according to claim 21, wherein the sensor member includes a concentric section which is sealingly surrounded by the tubular extension.

23. A transducer according to claim 21, wherein the sensor member is welded to the tubular extension.

24. A transducer according to claim 21, wherein the sensor member is a closed transducer element adapted to be prefabricated in mass production and separately pretested before installation in the assembly body.

25. A transducer according to claim 21, wherein the diaphragm section is formed flat and is protected from attacks by gas jets by an elastic protective diaphragm.

26. A transducer according to claim 21, wherein an elastic replaceable flame protection cap having gas through-flow openings is arranged in a diaphragm antechamber, said cap being operable to direct bundled gas jets diffusely onto the diaphragm section.

27. A transducer according to claim 21, wherein the sealing forces are separated from the prestress forces prevailing in the sensor member by a cylindrical gap between the sensor member and the assembly body.

* * * * *